(12) United States Patent
Gould et al.

(10) Patent No.: US 8,214,319 B2
(45) Date of Patent: Jul. 3, 2012

(54) DATA PROCESSING IN A DISTRIBUTED COMPUTING ENVIRONMENT

(75) Inventors: Mike Gould, Worcester Park (GB); Jan Stette, London (GB); Nick Giles, London (GB); Valerio Malenchino, Enfield (GB)

(73) Assignee: Ontology-Partners Ltd., London (GB)

( * ) Notice: Subject to any disclaimer, the term of this patent is extended or adjusted under 35 U.S.C. 154(b) by 801 days.

(21) Appl. No.: 12/362,043

(22) Filed: Jan. 29, 2009

(65) Prior Publication Data

US 2010/0191699 A1     Jul. 29, 2010

(51) Int. Cl.
*G06F 17/00* (2006.01)
*G06N 7/00* (2006.01)
*G06N 7/08* (2006.01)

(52) U.S. Cl. .......................................................... 706/59
(58) Field of Classification Search .................... 706/59, 706/10
See application file for complete search history.

(56) References Cited

U.S. PATENT DOCUMENTS

| | | | |
|---|---|---|---|
| 2003/0050915 A1 | 3/2003 | Allemang et al. | |
| 2003/0097637 A1 | 5/2003 | Tozawa et al. | |
| 2004/0031058 A1* | 2/2004 | Reisman | 725/112 |
| 2005/0246629 A1* | 11/2005 | Hu | 715/513 |
| 2007/0073684 A1* | 3/2007 | Ten Kate | 707/6 |
| 2007/0198448 A1* | 8/2007 | Fokoue-Nkoutche et al. | 706/45 |
| 2007/0233627 A1* | 10/2007 | Dolby et al. | 706/45 |
| 2008/0040308 A1* | 2/2008 | Ranganathan et al. | 707/1 |
| 2008/0168017 A1* | 7/2008 | Sreedhar et al. | 706/47 |
| 2008/0243451 A1* | 10/2008 | Feblowitz et al. | 703/2 |
| 2008/0294644 A1* | 11/2008 | Liu et al. | 707/10 |

FOREIGN PATENT DOCUMENTS

WO     WO-2010/086647 A2     8/2010

OTHER PUBLICATIONS

'Web information extraction': Lam, 2005, IEEE, 0/7803-9303-1, pp. 596-601.*
'Beyond ontology construction; Ontology services as online knowledge sharing communities': Li, ISWC 2003, LNCS 2870, pp. 469-483.*
'Structured document transformation based on XSL': Maneth, 2000, Springer-Verlag, LNCS 1949, pp. 80-98.*
"International Application No. PCT/GB2010/050117, International Search Report and Written Opinion mailed Dec. 14, 2010", 12 pgs.
Schlicht, Anne, "Towards Distributed Ontology Reasoning for the Web", IEEE/WIC/ACM International Conference on Web Intelligence and Intelligent Agent Technology, 2008. WI-IAT '08, vol. 1, (2008), 536-539.

* cited by examiner

*Primary Examiner* — Omar Fernandez Rivas
*Assistant Examiner* — Peter Coughlan
(74) *Attorney, Agent, or Firm* — Schwegman, Lundberg & Woessner, P.A.

(57) ABSTRACT

A computerized system configured to provide a data cell graph for a distributed data set comprised of different data formats. The system comprises a plurality of data repositories, each data repository configured to retain a portion of the distributed data set translated into a uniform semantic language and a plurality of processing cells, each processing cell configured to translate a portion of the distributed data set into the uniform semantic language, wherein the processing cells are further configured to perform at least one of applying rules to classify data against semantic knowledge models and/or adding inferred facts to and/or transforming the structure of the data found in the translated data in the data repository. The processing cells are configured in a computerized data cell graph so as to progressively create a unified semantic knowledge model for the distributed data set.

34 Claims, 7 Drawing Sheets

```
                ⎧  <config>                                                    ⎫─500
          501 ⎨  <description>Example Config Fragment</description>
                ⎩  <name>example</name>

⎧     < LOADING CELL >
          ⎪     ⎧ <config item>
          ⎪ 515 ⎨ <property name='service factoryPid"value="com. ontologypartners core cell CellFactory"/>
          ⎪     ⎪ <property name='cell.name" value='example loader"/>
          ⎪     ⎩ <property name='cell.description" value="Example Loading Cel"/>

⎪     ⎧ <property name='cell.inputs" value='example"/>
          ⎪     ⎪ <property name='cell.inputs.example.factory.id" value="data-mapping-input"/>
          ⎪     ⎪ <property name='cell.inputs.example.filename" value="example_data.txt"/>
          ⎪ 503 ⎨ <property name='cell.inputs.example.format" value="some_format"/>
          ⎪     ⎪ <property name='cell.inputs.example.mapping" value="example-mapping.xml"/>
          ⎪     ⎪ <property name='cell.inputs.example.xslt.generator" value="importXslGenerator-\2.xsl"/>
          ⎪     ⎪ <property name='cell.inputs.example.added-context"
          ⎪     ⎩   value="http:/ontology.com/graph/example"/>
     502 ⎨
          ⎪     ⎧ <property name='cell.processor" value="processor"/>
          ⎪ 504 ⎨ <property name='cell.processor.processor.factory.id" value="de-dupe.processor"/>
          ⎪     ⎪ <property name='cell.processor.processor.output-context"
          ⎪     ⎩   value="http:/ontology.com/graph/example/de-dupe"/>

⎪     ⎧ <property name='cell.outputs">
          ⎪     ⎪ <value>output</value>
          ⎪ 505 ⎨ <property>
          ⎪     ⎪ <property name='cell.outputs.output.factory.id" value="repository-output"/>
          ⎪     ⎪ <property name='cell.outputs.output.repository.name" value="example"/>
          ⎩     ⎩ </config-item>

⎧     < REPOSITORY >
          ⎪     ⎧ <config item>
          ⎪     ⎪   <property name="service.factoryPid"
          ⎪ 516 ⎨   value="com.ontologypartners.core.repository.AutoimportListenerFactory"/>
          ⎪     ⎪   <property name="description" value="impor. any referenced ontologies into the repository"/>
          ⎪     ⎪   <property name="repository.name" value="example"/>
          ⎪     ⎩ </config item>
          ⎪     ⎧ <config item>
          ⎪     ⎪   <property name="service.factoryPid"
          ⎪ 507 ⎨   value="com.ontologypartners.core.repository.RepositoryExportHandlerFactory"/>
          ⎪     ⎪   <property name="description" value="All repository export"/>
     506 ⎨     ⎪   <property name="repository.name" value="example"/>
          ⎪     ⎩ </config item>
          ⎪     ⎧ <config item>
          ⎪     ⎪   <property name="service.factoryPid"
          ⎪ 508 ⎨   value="com.ontologypartners.core.repository.RepositoryResetHandlerFactory"/>
          ⎪     ⎪   <property name="description" value="All repository reset"/>
          ⎪     ⎪   <property name="repository.name" value="example"/>
          ⎪     ⎩ </config item>
          ⎪     ⎧ <config item>
          ⎪     ⎪   <property name="service.factoryPid"
          ⎪ 509 ⎨   value="com.ontologypartners.core.repository.ExampleFileRepositoryFactory"/>
          ⎪     ⎪     <property name="description" value="Reasoned Example data"/>
          ⎪     ⎪     <property name="repository.name" value="example"/>
          ⎩     ⎩ </config item>
```

DATA PROCESSING IN A DISTRIBUTED COMPUTING ENVIRONMENT

FIELD

Embodiments of the invention relate to systems and methods for providing a unified and/or enhanced view of data. More particularly, an embodiment of the invention relates to systems and methods that employ semantic knowledge models to enable a unified and/or enhanced view of data obtained from multiple, disparate sources pertaining to the same domain of discourse.

BACKGROUND

Difficulties arise in producing a unified view of data that is spread across multiple and/or overlapping systems that nevertheless describe aspects of the same domain of discourse. For example, a sophisticated telecommunications network may have a plethora of data stored in a multiplicity of formats such that a unified data scheme cannot be readily obtained or accessed. Put another way, there exist enormous challenges in enriching data from multiple data sources with implicit facts that can be inferred from the data contained in those sources, managing overlaps in the data sources, and presenting a unified view of the data and inferred facts.

The prior art typically attempts to solve these problems using one of the following methods:
- direct integration of external data sources to a central schema representing a unified view of the data; or
- integration of the external data sources to an "Enterprise Integration Bus" or "Enterprise Service Bus" and then enabling communications from the software providing the unified view to the external systems through the bus; or
- employing semantic federation, whereby the external data sources are mapped to semantic knowledge models which are then bridged using well understood approaches, such as bridging axioms and class and property subsumption.

For a variety of reasons, all of these solutions are inadequate or inappropriate for many of the most commercially significant problem domains.

SUMMARY OF THE INVENTION

Embodiments of the invention provide a computerized system configured to enhance data originating in a distributed data set whose data elements have a plurality of formats. The computerized system comprises a plurality of computerized processing cells. Each computerized processing cell is configured to add inferences to data from the distributed data set by translating a portion of the data from the distributed data set into a common semantic information representation shared among the plurality of computerized processing cells, wherein at least a portion of the plurality of computerized processing cells are arranged in a computerized data cell graph configured to progressively build a semantic knowledge model from the distributed data set in the common semantic information representation.

Further embodiments of the invention provide a computerized cell graph configured to produce a unified semantic knowledge model from a plurality of data sources having disparate data formats. The computerized cell graph comprises a plurality of computerized importer cells, wherein each importer cell is configured to retrieve data from a data source of the plurality of data sources and translate the retrieved data into a common semantic information representation. The computerized cell graph further comprises a plurality of data repositories, wherein a portion of the data repositories are configured to receive and store translated data received from importer cells of the plurality of importer cells in the common semantic information representation. The computerized cell graph also comprises a plurality of computerized processing cells, wherein each processing cell is configured to retrieve data from at least one data repository of the plurality of data repositories, enhance the retrieved data to further develop the unified semantic knowledge model and store the enhanced retrieved data in the common semantic information representation in a data repository of the plurality of data repositories. The plurality of importer cells, the plurality of data repositories, and the plurality of processing cells are arranged to progressively create the unified semantic knowledge model from the plurality of data sources. A processing cell of the plurality of processing cells is configured to complete the unified semantic knowledge model and store it in a data repository of the plurality of data repositories.

Still further embodiments of the invention provide a computerized system configured to enhance data from a distributed data set comprised of different data formats. The computerized system comprises a plurality of data repositories, each data repository configured to retain a portion of the distributed data set translated into a uniform semantic language. The computerized system also comprises a plurality of computerized processing cells. Each processing cell is configured to perform at least one of applying rules to classify data retrieved from a data repository of the plurality of data repositories against a semantic knowledge model and/or adding inferred facts to data retrieved from a data repository of the plurality of data repositories and/or transforming a data structure of data retrieved from a data repository of the plurality of data repositories, wherein the plurality of processing cells are configured in a computerized data cell graph so as to progressively create a unified semantic knowledge model from the distributed data set.

Embodiments of the invention also provide a system for producing a unified semantic knowledge model from a plurality of data sources having disparate semantic knowledge models. The system comprises a plurality of computerized importer cells, with each importer cell configured to map a data source of the plurality of data sources into a common semantic language. Each importer cell comprises a format translation engine configured to review a first style sheet to generate a second style sheet, wherein the first style sheet describes actions to be taken when a data translation engine reads a particular data structure, the first style sheet comprising a user-configurable mapping plan for the data source mapped by the importer cell and wherein the second style sheet comprises the first style sheet in a format suitable for processing by an automated data translation engine. Each importer cell also comprises a format-specific parser configured to read an input data format for the data source and produce a data file that describes data of the data source in a format suitable for processing by an automated data translation engine. Each importer cell also comprises an automated data translation engine configured to use the data file produced by the format-specific parser and the second style sheet produced by the format translation engine to transform data from the data source into data in the common semantic language and make the transformed data available to other importer cells and external users.

Embodiments of the invention provide a computerized method for enhancing data originating in a distributed data set whose data elements have a plurality of formats. The method comprises translating data from the distributed data set into a common semantic information representation shared among a plurality of computerized processing cells arranged in a computerized data cell graph. The method further comprises adding inferences to portions of the translated data by the computerized data cell graph to progressively construct a semantic knowledge model in the common semantic information representation.

Embodiments of the invention further provide a method for producing a unified semantic knowledge model from a plurality of data sources having disparate data formats using a computerized cell graph. The method comprises progressively building the unified semantic knowledge model from the plurality of data sources using the computerized cell graph comprising a plurality of importer cells, a plurality of data repositories, and the plurality of processing cells. The importer cells, data repositories and processing cells are arranged to perform the steps of translating data retrieved from data sources of the plurality of data sources into a common semantic information representation by a plurality of computerized importer cells, storing translated data received from importer cells of the plurality of importer cells in the common semantic information representation in a plurality of data repositories, and enhancing data retrieved from data repositories of the plurality of data repositories in a plurality of computerized processing cells and storing the enhanced retrieved data in the common semantic information representation in a data repository of the plurality of data repositories.

Embodiments of the invention also provide a computerized method for enhancing data from a distributed data set comprised of different data formats. The computerized method comprises the steps of progressively creating a unified semantic knowledge model from the distributed data set using a plurality of computerized processing cells arranged in a computerized data cell graph configured to create the unified semantic model by translating portions of the distributed data set into a uniform semantic language and storing each translated data portion in a plurality of data repositories and retrieving translated data portions from the plurality of data repositories by computerized processing cells of the computerized data cell graph and enhancing the retrieved data by performing at least one of applying rules to classify retrieved translated data portions against a semantic knowledge model and/or adding inferred facts to retrieved translated data portions and/or transforming a data structure of retrieved translated data portions.

Embodiments of the invention further provide a method for producing a unified semantic knowledge model from a plurality of data sources having disparate semantic knowledge models. The method comprises mapping data sources of the plurality of data sources into a common semantic language using a plurality of computerized importer cells. Each importer cell is configured to review a first style sheet to generate a second style sheet using a format translation engine, wherein the first style sheet describes actions to be taken when a data translation engine reads a particular data structure, the first style sheet comprising a user-configurable mapping plan for the data source mapped by the importer cell and wherein the second style sheet comprises the first style sheet in a format suitable for processing by an automated data translation engine. Each importer cell is also configured to read an input data format for the data source by a format-specific parser and producing a data file that describes data of the data source in a format suitable for processing by a data translation engine. Each importer cell is also configured to transform data from the data source into data in the common semantic language by an automated data translation engine configured to use the data file produced by the format-specific parser and the second style sheet produced by the format translation engine. Each importer cell is also configured to make the transformed data available to other importer cells and external users.

BRIEF DESCRIPTION OF THE DRAWINGS

FIG. 5 illustrates a configuration file 500 designed to instantiate a specific cell graph, such as the cell graph 107 shown in FIG. 1, according to an embodiment of the invention;

DETAILED DESCRIPTION OF AN EMBODIMENT OF THE INVENTION

Embodiments of the invention enable a progressive data enrichment and/or unification process that generates a unified and/or enhanced view of the original data collection according to a semantic knowledge model in the domain of discourse. A "Semantic Knowledge Model," or "Semantic Model," or "Knowledge Model," or "Ontology," as used herein, comprises semantic information forming a model in a domain of discourse expressed as a set of terminological definitions, assertions of fact, and/or axioms in a form that has associated well-defined formal semantics. "Semantic Information" or "Semantic Information Representation" or "Semantic Information Format" or "Semantic Language" as used herein, comprises information stored or represented in a form that includes associated, well-defined formal semantics (e.g., model theoretic semantics or axiomatic semantics). An example of such a representation is the Resource Description Framework (RDF) language standardized by the World Wide Web Consortium. RDF represents but one example of a representation that could be used in conjunction with embodiments of the invention.

Embodiments of the invention may allow data at intermediate points in a cell graph to be examined and used by diverse sub-systems. Information processing systems may often be effectively scaled by partitioning data processing over sequentially ordered processing entities called "Cells." Accordingly, such information systems may comprise many processing nodes. These cells may be connected in sequence, in a pattern somewhat resembling a graph, to provide a set of data processing capabilities and/or objectives for a particular configuration of an information processing system. An interconnected graph of processing cells, as used herein, is referred to as a "Cell Graph" or a "Pipeline." Embodiments of the invention may enable systems to be inherently scaled based on the configuration of their corresponding cell graph, where the cell graph partitions data processing among a number of cells found in the graph. Similarly, redundancy can be designed into an information system by replicating a part or the entire cell graph, according to an embodiment of the invention.

Embodiments of the invention may also simplify the process of understanding what is being done to data in an information processing system in order to generate a unified data view. As used herein, a "Unified Data View" comprises a system in which data residing in, or originating in, various diverse sub-systems may be reviewed and/or acted upon by end users and/or other data processing systems without such users or systems having a need to know or understand the native data format and/or related ontology of the data as it resides in a given sub-system. Thus, embodiments of the invention enable "comprehensibility" of the data to the end user(s).

Embodiments of the invention may offer improved performance over the prior art mentioned above for several reasons. Many systems in the prior art provide direct integration to a central schema. Direct integration to a central schema produces extremely brittle systems overall with high coupling between the central schema and the external systems. In such systems, the semantic knowledge model is implicit in the schema design, and changes to the schema require integrations to be rebuilt. Other systems in the prior art utilize integration to an Enterprise Integration Bus (EIB). Integration to an EIB requires that all entities exchanging information have prior knowledge of the message formats and definitions used to pass information through the EIB. These requirements make this approach effectively equivalent to using a central schema, except that the "schema" is implicit and fragmented across the defined message formats. Still other prior art systems employ bridged semantic knowledge models. The direct bridging of all semantic knowledge models results in aggregate semantic knowledge models that present currently unsolved problems associated with the computational complexity of reasoning over them and furthermore. It is currently not well understood how reasoning and inference over these semantic knowledge models could be distributed over many computing nodes.

Figure 1:
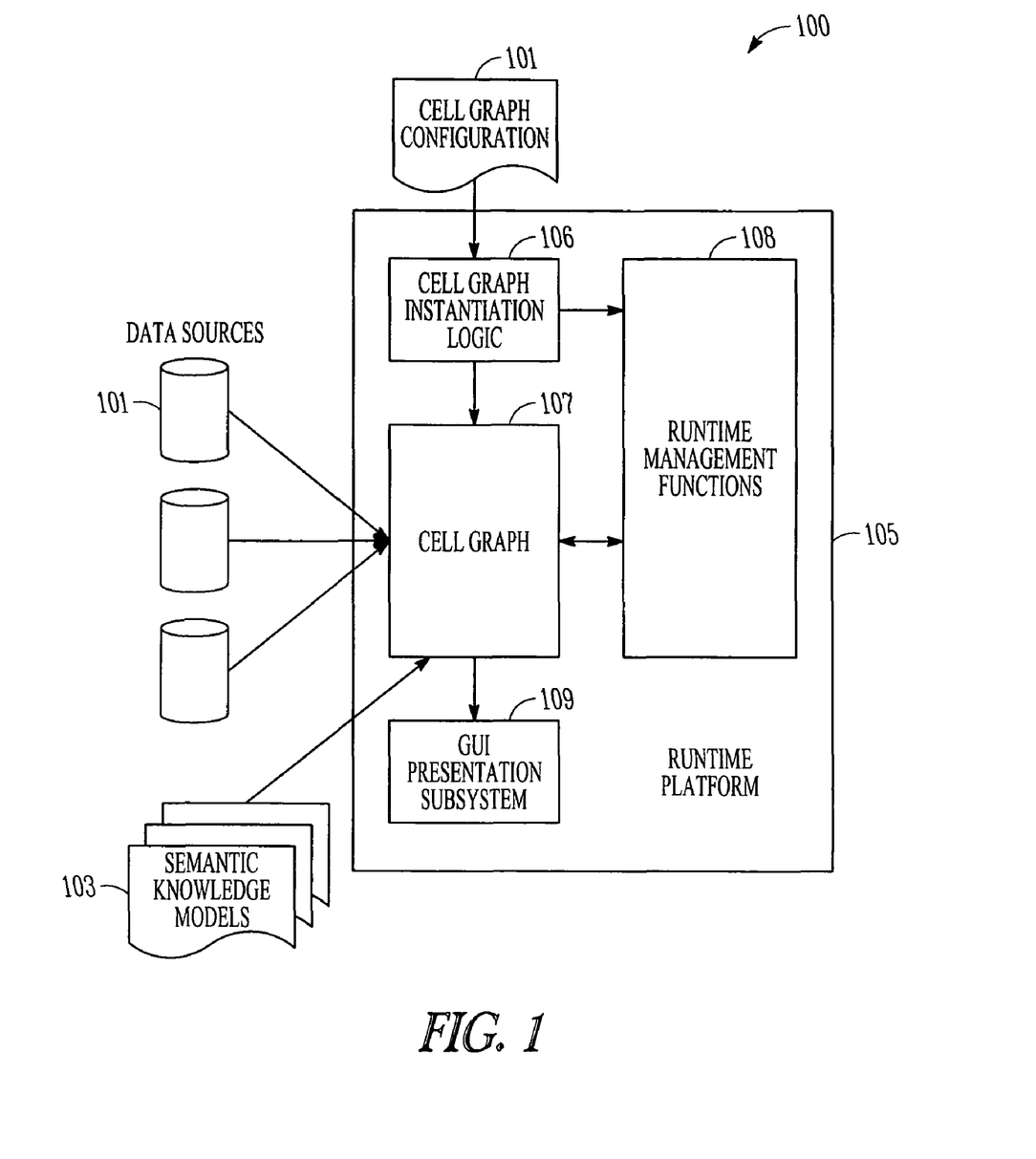
FIG. 1 illustrates a logical overview of an information processing system 100 configured to unify and/or enhance data from a multiplicity of data sources 102 in accordance with a multiplicity of semantic knowledge models 103, according to an embodiment of the invention.

FIG. 1 illustrates a logical overview of an information processing system 100 configured to unify and/or enhance data from a multiplicity of data sources 102 in accordance with a multiplicity of semantic knowledge models 103, according to an embodiment of the invention. The system 100 comprises a computer-controlled runtime platform 105 containing runtime management functions/logic 108 to start and stop the system and to manage communications between processing nodes in embodiments where processing is distributed over many processing nodes. For utmost clarity, the processing nodes represent computers and/or computerized systems of various sorts. The system 100 further comprises cell graph instantiation logic 106 configured to read cell graph configuration 101 and instantiate the specific cell graph 107 that it specifies. The system 100 further comprises a graphical user interface presentation subsystem 109 that allows user interfaces to be configured for presentation of and interaction with the semantic knowledge models 103 and cell graph 107.

Figure 2:
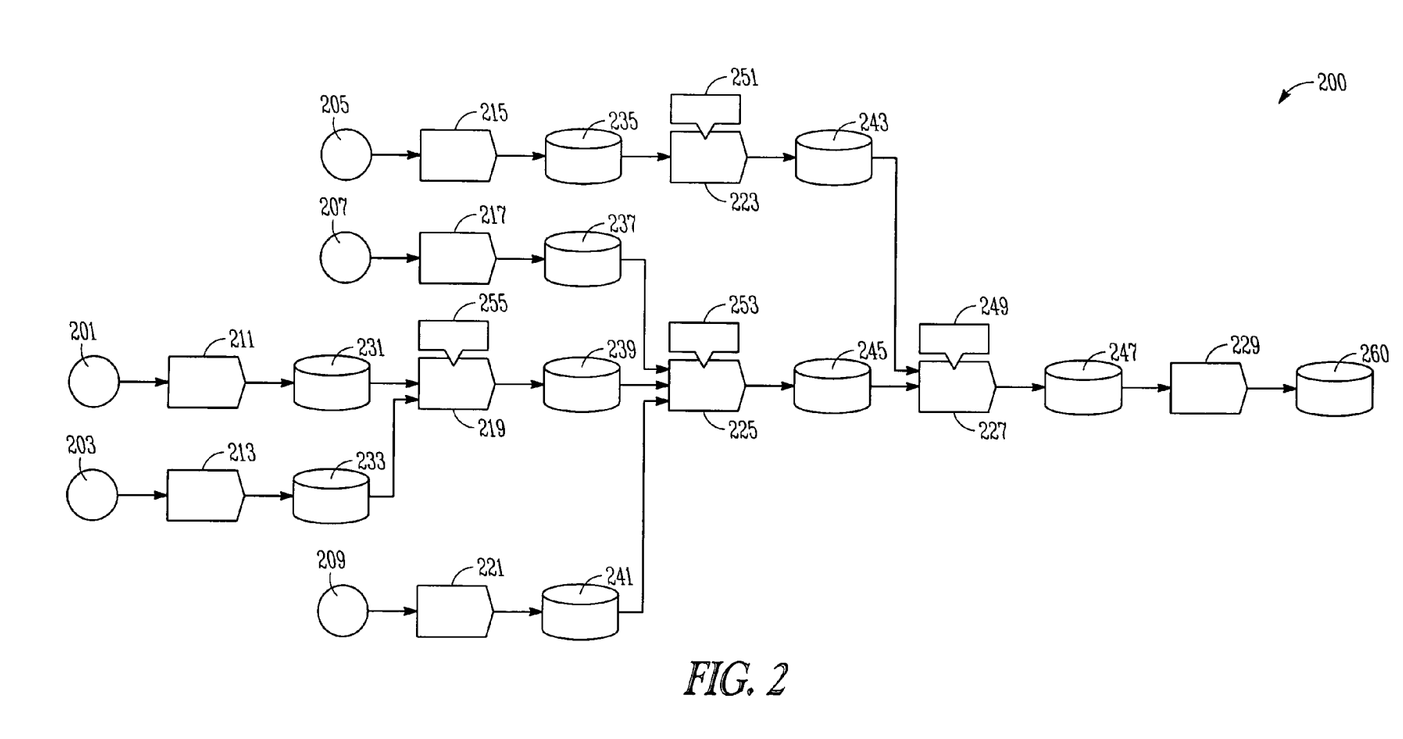
FIG. 2 illustrates a cell graph 200 configured to provide an enhanced and/or unified view of the data in diverse subsystems, according to an embodiment of the invention.

FIG. 2 illustrates a cell graph 200 configured to provide an enhanced and/or unified view of the data in diverse sub-systems, according to an embodiment of the invention. The cell graph 200 represents an example of the cell graph 107 as shown in FIG. 1, according to an embodiment of the invention.

As shown in FIG. 2, the cell graph 200 comprises a plurality of "importer" cells 211, 213, 215, 217, 221 configured to take data sources 201, 203, 205, 207 and 209 and map them to a representation, such as RDF, that encodes semantic information, according to an embodiment of the invention. The data sources 201, 203, 205, 207, 209 represent similar data sources to the data sources 102 shown in FIG. 1. Data sources 201, 203, 205, 207, 209 may comprise arbitrary (non-specific) data, according to an embodiment of the invention. RDF, or the Resource Description Framework is a family of World Wide Web Consortium (W3C) specifications, originally designed as a metadata data model, which has come to be used as a general method of modeling information through a variety of syntax formats. Other representations for encoding semantic information may also be used with embodiments of the invention instead of RDF.

Each importer cell, such as importer cell 211, generally asserts the existence of particular data into a corresponding output repository but does not decide into which larger class the data resides, a task that is typically performed further "upstream" in the cell graph 200 by a processing cell, such as processing cell 219. "Asserts" here includes, but is not necessarily limited to "writing" the data; since the models stored in the output repositories are semantic models, they are generally spoken about in the field of semantics as "containing assertions about the domain of discourse."

The cell graph 200 further comprises a plurality of "processing" cells 219, 223, 225, 227, 229 configured to take one or more inputs carrying data (e.g., RDF data) and emit data (e.g., RDF data) through an output, according to an embodiment of the invention. As noted above, data representations in formats other than RDF may be used in embodiments of the invention. The cell graph 200 additionally contains a plurality of data repositories 231, 233, 235, 237, 239, 241, 243, 245, 247, 260 configured to store semantic knowledge models in a data format such as RDF, wherein the data repositories may be queried either directly by end users through the user interfaces of the system 100 or by external systems interacting with the cell graph 200 about the semantic modeling information that the data repositories contain.

Data may be progressively enriched through the application of semantic knowledge models 251, 253, 255, 249 to enable inference over the data and combined through processing at various processing cells (e.g., processing cell 225) to produce a unified model, such as that held in the merged model stored in repository 247 shown in FIG. 2. Thus, for example, the outputs of data repositories 231, 233 is progressively enriched by processing cell 219, and the enriched data produced by processing cell 219 and stored in data repository 239 is further enriched, along with other data, by processing cell 225 and stored in data repository 245. This approach illustrates the way in which the overall, or implicit, semantic knowledge model is "spread out" over the cell graph 200. Note also that not all processing cells receive inputs from a semantic knowledge model. As shown in cell graph 200, only 4 processing cells (219, 223, 225, and 227) are paired with a semantic knowledge model (respectively 255, 251, 253, and 249). The processing cells not paired with a semantic knowledge model carry out other non-ontological processing tasks such as the removal of duplicate data entities.

As an example of the type of inference that a processing cell (e.g., the processing cell 227) might add to data from a data repository (e.g., data repository 245) in accordance with a semantic knowledge model (e.g., the semantic knowledge model 249), consider a data set which contains the assertion that there is a person called "John." A processing cell (e.g., the processing cell 227) configured with a semantic knowledge model (e.g., the semantic knowledge model 249) which contains a statement to the effect that "all people have mothers" would enrich the original data with the inferred fact that "John has a mother."

Thus, the cell graph 200 comprises an arrangement of importer cells 211, 213, 215, 217, and 221, processing cells 219, 223, 225, 227, 229 and data repositories 231, 233, 235, 237, 239, 243, 245, 247, 260 in a connected graph where cells and repositories alternate in sequence, according to an embodiment of the invention. The processing cells and data repositories alternate in sequence because the output of a processing cell typically must be stored some place, according to an embodiment of the invention. In an alternative embodiment of the invention, the output of one processing cell may be immediately fed into another system, such as another processing cell, with the potential for intermediate results to be lost in the event of an unanticipated failure.

Because of the progressive enrichment of data, the "sum" of two downstream data repositories (e.g., data repositories 243, 245) is "less" than the data in upstream data repository 247 and still less than further upstream data repository 260. For example, processing cell 227 may have explicitly added "inferred information" in accordance with the concepts described by semantic knowledge model 249. In addition, information found in either data repository 243 and/or data repository 236 might have been removed, or "subtracted" during processing such that the data will not reside in either data repository 247 and/or data repository 260. Imagine, for example, that data repository 247 holds a complete unified model of all the original data and that processing cell 229 is assigned the task of removing and restructuring the unified data to produce a simplified data model for some particular purpose that is stored in data repository 260.

The system 100 shown logically in FIG. 1 is thus configurable to enable the importer cells (e.g., importer cell 211) and processing cells (e.g., processing cell 225) to run on separate computing nodes connected to each other via a communications network. The system 100 does not require that the importer and processing cells run on separate computing nodes, and alternative embodiments are possible.

The cell graph 200 may be configured so that changes in either an input data source (e.g., input data source 201) or any intermediate data repository (e.g., data repository 239) cause recalculation by upstream cells (e.g., processing cell 225) thus propagating the changes upstream through the connected cell graph 200, according to an embodiment of the invention.

Figure 3:
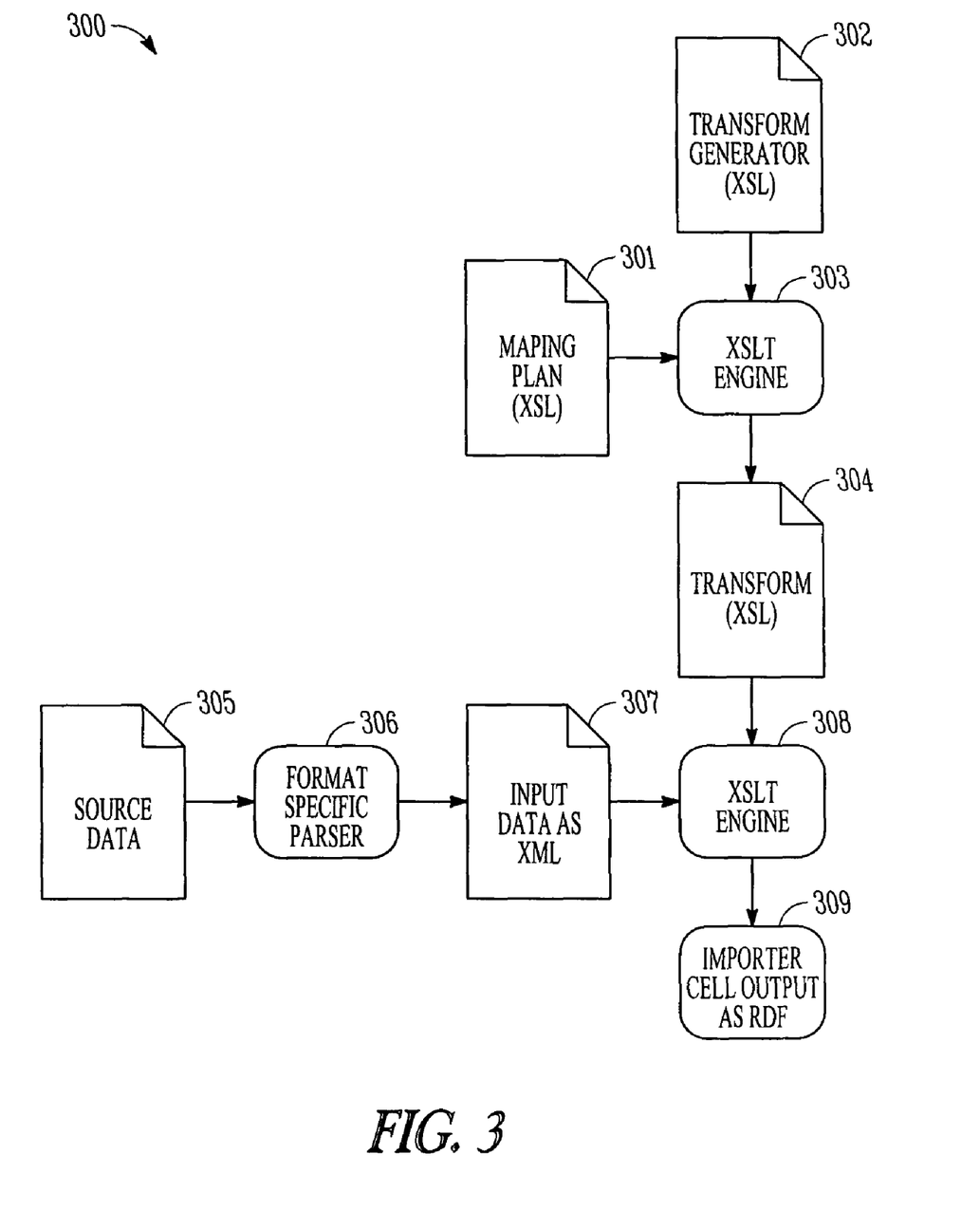
FIG. 3 illustrates aspects of the processing performed by an importer cell 300 configured to map the contents of a data source to a representation in a data format such as RDF, according to an embodiment of the invention.

FIG. 3 illustrates aspects of the processing performed by an importer cell 300 configured to map the contents of a data source to a representation in a data format such as RDF, according to an embodiment of the invention. The importer cell 300 could be, for example, one of the "importer" cells 211, 213, 215, 217, and 221 shown in FIG. 2, which are respectively configured to map the contents of the data sources, 201, 203, 205, 207 and 209 to a representation in a data format such as RDF. As mentioned above, the data representation may be encoded in a representation other than RDF.

System operator(s) configure the importer cell 300 to express actions that the importer subsystem should take when it reads a particular structure in the input data, such as entries in an XML file called a Mapping Plan 301, according to an embodiment of the invention. For example, an XSLT Engine 303 may use an XSL style sheet 302, acting as a transform generator, to generate a second XSL style sheet 304, serving as a generated transform, from the Mapping Plan 301. The XSL transform generator 302 encodes the transformation of the action descriptions in the Mapping Plan 301 to transformations actionable by the XSLT Engine 303. These are written to the second style sheet 304, acting as a generated transform. XSLT or "Extensible Stylesheet Language Transformations" is an XML-based language used for transforming XML documents into other XML, "human-readable" documents, or other formats. The XSLT engine 303 is thus configured to automatically perform such transactions. Embodiments of the invention in which the Mapping Plan 301 is encoded in a language other than XML would typically replace the XSLT Engine 303 with another engine that was capable of performing a similar translation on documents encoded in the other language. Thus, the use of XML and/or an XSLT engine represent examples of formats and engines that may be used, according to an embodiment of the invention.

A format-specific parser 306 configured for the input data format reads source data 305 and produces a file 307, such as an XML file, that describes the input data (e.g., data source 201) by explicitly representing its structure. For example, data from a relational database source might be described directly in terms of rows, columns, tables and their contents. (The file 307 could be produced as another data type, including possible an RDF-XML file.) A second XSLT engine 308 takes the generated transform 304 and the XML file 307 for the input data to produce RDF "individuals," or "instances of RDF classes," that are written to the importer cell output 309, according to an embodiment of the invention. Thus, by this process the importer cell 300 transforms the input data into a semantic description such as RDF, according to an embodiment of the invention. As previously mentioned, formats and systems other than RDF, XML, and XSLT may be used.

Figure 4A:
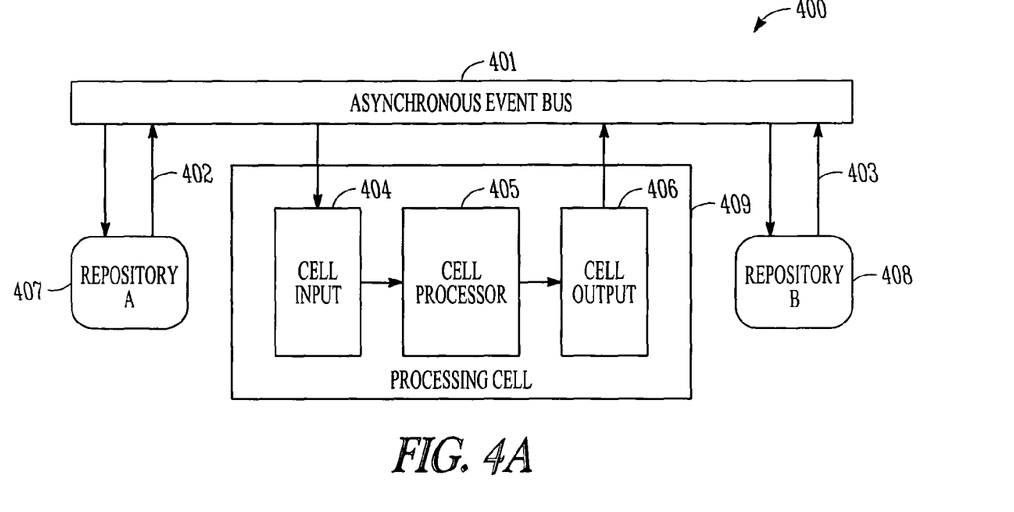
FIG. 4A illustrates the internal structure of a processing cell 409 (e.g., the processing cell 229 shown in FIG. 2) and its connectivity to two data repositories 407 and 408, according to an embodiment of the invention.

FIG. 4A illustrates the internal structure of a processing cell 409 (e.g., the processing cell 229 shown in FIG. 2) and its connectivity to two data repositories 407 and 408, according to an embodiment of the invention. The cells in a cell graph (e.g., the cell graph 200) are typically connected to a distributed asynchronous event bus, such as distributed asynchronous event bus 401, configured to deliver typed events from sending entities to receiving entities registered to receive events of particular type or types, according to an embodiment of the invention.

In other words, as shown in FIG. 4A, the processing cell 409 and data repository 407 are registered with each other. The processing cell 409 comprises a cell input 404 configured to read data from the preceding repository 407, a cell processor 405, and a cell output 406 configured to write data to the subsequent repository 408. The cell processor 405 performs the specific progressive enrichment task assigned to the processing 409, such as the ontological progressing discussed above with reference to the processing cell 219 shown in FIG.

2. For example, inferencing represents an example of an enrichment task that could be performed by the cell processor 405.

A cell may be constructed with one or more cell inputs 404, one cell processor 405 and one or more cell outputs 406, according to an embodiment of the invention. Different types of cell parts may be provided in any particular embodiment. In other words, it is possible to create parts that do new things—for example, cell inputs that read from new types of input, cell processors that implement a new type of inference engine, etc. In the example shown in FIG. 4A, input data is sourced from Repository A 407 and output data is written to Repository B 408. Data communications between the Repository A 407, the processing cell 409, and the Repository B 408 occur via the asynchronous event bus 401, according to an embodiment of the invention.

Figure 4B:
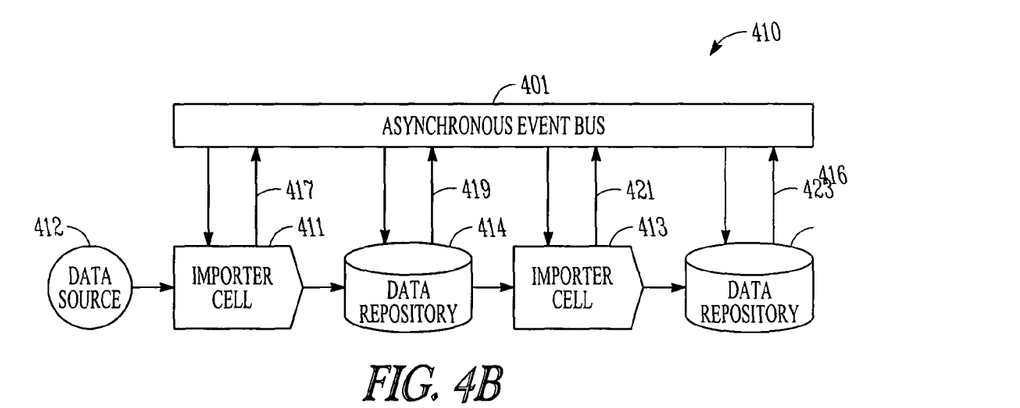
FIG. 4B illustrates how cells of various types and data repositories in a cell graph may be connected to an event bus, according to an embodiment of the invention.

FIG. 4B illustrates how cells of various types and data repositories in a cell graph may be connected to an event bus, according to an embodiment of the invention. FIG. 4B shows a cell graph 410 comprising an importer cell 411 configured to read data from an input data repository 412, a processing cell 413 and two repositories 414, 416. The cells 411, 413 and repositories 414, 416 are connected to the asynchronous event bus 401. The asynchronous event bus 401 operates in a conventional manner for such buses, allowing events and data to be easily transmitted from one cell type and/or data repository to another.

FIG. 5 illustrates a configuration file 500 designed to instantiate a specific cell graph, such as the cell graph 107 shown in FIG. 1, according to an embodiment of the invention. As discussed above, information processing systems, such as the information processing system 100 shown in FIG. 1, typically include a cell graph configuration, such as the cell graph configuration 101 shown in FIG. 1, that is designed to instantiate a specific cell graph. The configuration file 500 provides a further illustration of a configuration file suitable for instantiating a cell graph, according to an embodiment of the invention.

An XML configuration file may be used to specify the configuration of cells in a connected cell graph (e.g., cell graph 200 shown in FIG. 2), the configuration of cell parts into cells and the configuration of importer cells illustrated in FIG. 2, FIG. 3 and FIGS. 4A and 4B, according to an embodiment of the invention. Of course, languages other than XML may be used in accordance with embodiments of the invention.

The configuration file 500 comprises a configuration header 501, a cell configuration section 502 and a repository configuration section 506. The configuration header 501 specifies a name and description for the configuration. The cell configuration section 502 specifies a cell-type specific configuration 503, 504 and cell configuration header 515 that specifies the name, description and type of the cell and output specification 505. The output specification 505 specifies the name of the repository to which the cell writes its output. The repository configuration section 506 comprises a series of behavior specifications 516, 507, 508 and 509 which specify the behavior required of a specific repository (e.g., repository 239 shown in FIG. 2). The cell-type specific configurations 503, 504 are configurations specific to the particular type of cell being instantiated.

Figure 6:
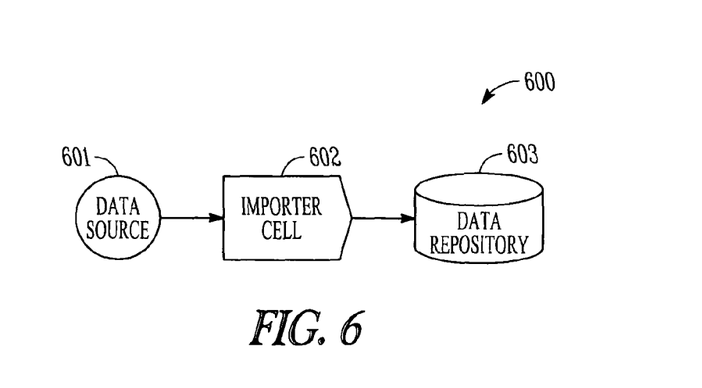
FIG. 6 illustrates a simple cell graph 600 corresponding to the XML configuration file 500 shown in FIG. 5, according to an embodiment of the invention.

Having described the component parts of a representative embodiment, there now follows a description of how such a system configuration may be achieved by a system operator. FIG. 6 illustrates a simple cell graph 600 corresponding to the XML configuration file 500 shown in FIG. 5, according to an embodiment of the invention. That is to say, if a file containing the configuration 500 is provided to an embodiment of the invention, this would cause it to instantiate the cell graph 600 shown in FIG. 6.

Figure 7:
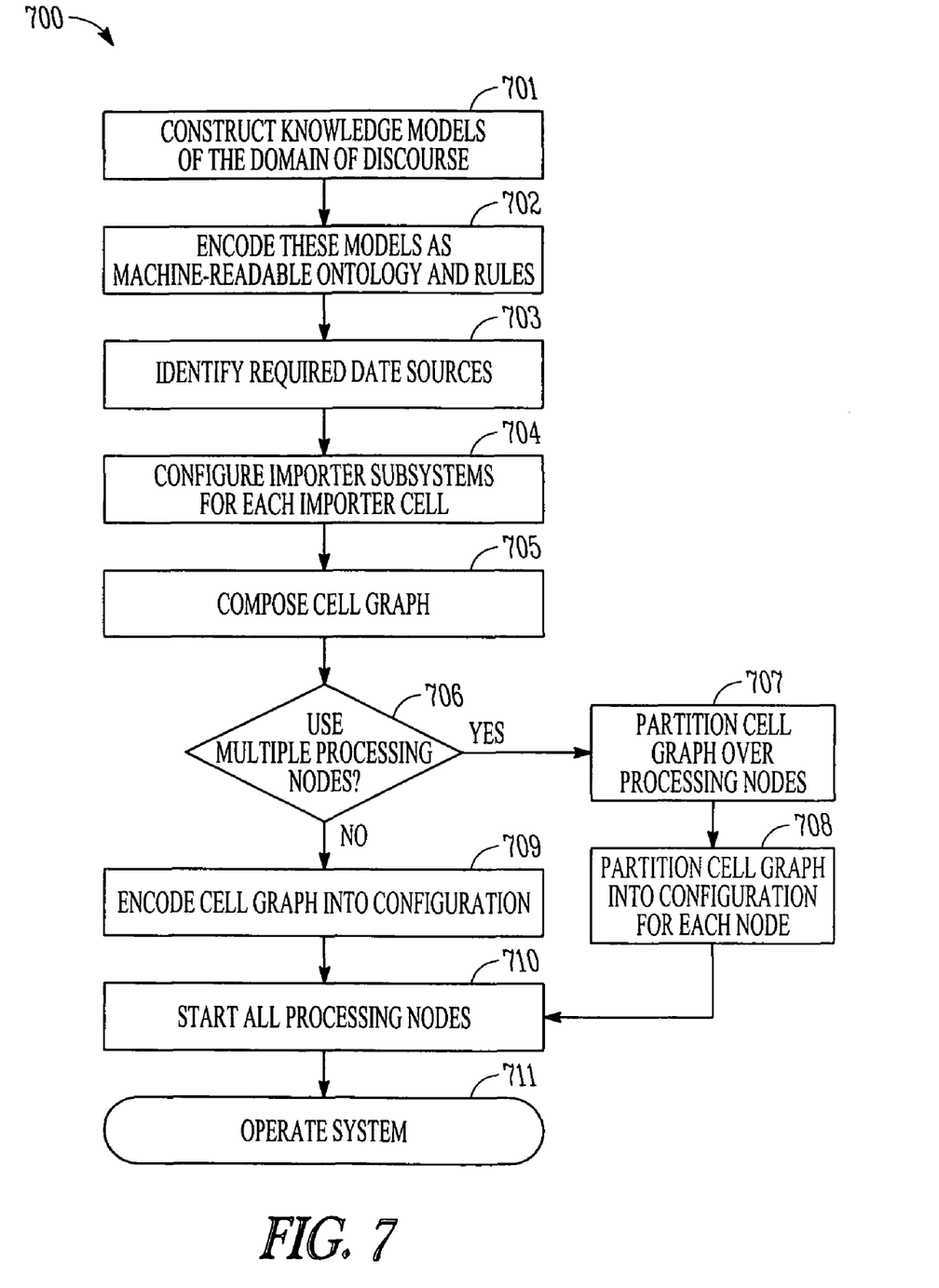
FIG. 7 illustrates a process 700 that allows a system operator to configure a system, such as the system 100 shown in FIG. 1, to provide a unified and/or enhanced view of multiple data sources, according to an embodiment of the invention.

FIG. 7 illustrates a process 700 that allows a system operator to configure a system, such as the system 100 shown in FIG. 1, to provide a unified and/or enhanced view of multiple data sources, according to an embodiment of the invention. The system operator begins by constructing semantic knowledge models of the particular domain of discourse (step 701). The process of constructing such models proceeds using the methods and skills known to those in the field of semantic knowledge modeling. Once completed, these semantic knowledge models are typically encoded in a machine readable form using a knowledge representation language such as OWL (step 702). OWL, or the "Web Ontology Language," represents a family of knowledge representation languages for authoring semantic knowledge models. Other languages may be used in place of OWL.

The system operator typically next identifies the set of data sources that he requires (step 703), such as the data sources 201, 203 shown in FIG. 2. The system operator configures importer subsystems, such as the importer cells (step 704) as described in FIG. 3 to convert the data to a representation such as RDF, according to an embodiment of the invention. As previously stated, representations other than RDF may be used with embodiments of the invention.

The system operator then determines the appropriate processing steps for the data, such as classification against semantic knowledge models and transformation of populated repositories, and designs a conceptual cell graph to represent this processing (step 705). As described above, step 701 concerns constructing semantic knowledge models that the cells may use by employing a language such as OWL. Step 705 concerns designing the ordering and connectivity of the cells (e.g., the cell graph).

In determining the appropriate processing steps, the system operator applies the general knowledge customary to those of ordinary skill in the semantic knowledge modeling field and the domain of discourse—for example, telecommunications management systems. With reference to FIG. 1, the system operator might want an intermediate result available to end user data consumers. In other words, the system operator might want to configure the cell graph in such a way so that there is an intermediate result or step.

The system operator must then decide whether or not the system will be partitioned to run over multiple processing nodes (step 706) by considering, among other things, the particular format and quantity of data that will be processed by the configured system. There are typically two reasons why a system operator might decide to partition the system to run over multiple processing nodes.

First, the system operator may wish to distribute the processing load among multiple nodes. The system operator might take the cell graph (e.g., the cell graph 200 shown in FIG. 2) and "cut" it into fragments, such that each fragment runs on a specific processing node. As an ordinary artisan in this field should likely recognize, such decisions relate to form and the amount of data the system will ultimately process. For example, the system operator may typically assign importer cells, such as the importer cell 300 shown in FIG. 3, to dedicated processing nodes when such cells will be continually asked to read very large volumes of input data.

Second, the system operator might want to make parts of the cell graph identical and have them run on separate processing nodes in order to provide redundancy or failover for the system in operation.

Thus, if the system operator opts to break the cell graph (step 706), then the cell graph design must be partitioned or divided into fragments and these fragments allocated to particular processing nodes (step 707).

For each processing node (even in the case where there is only one), the system operator must then encode the respective cell graph fragments into a cell graph configuration as previously described in FIG. 5 (steps 708 and 709). Once each of the fragments is completed and the data sources are accessible, the system operator starts each processing node (step 710). The system will now automatically read the data from the data sources and process it through the cell graph populating repositories with the relevant models (step 711).

Figure 8:
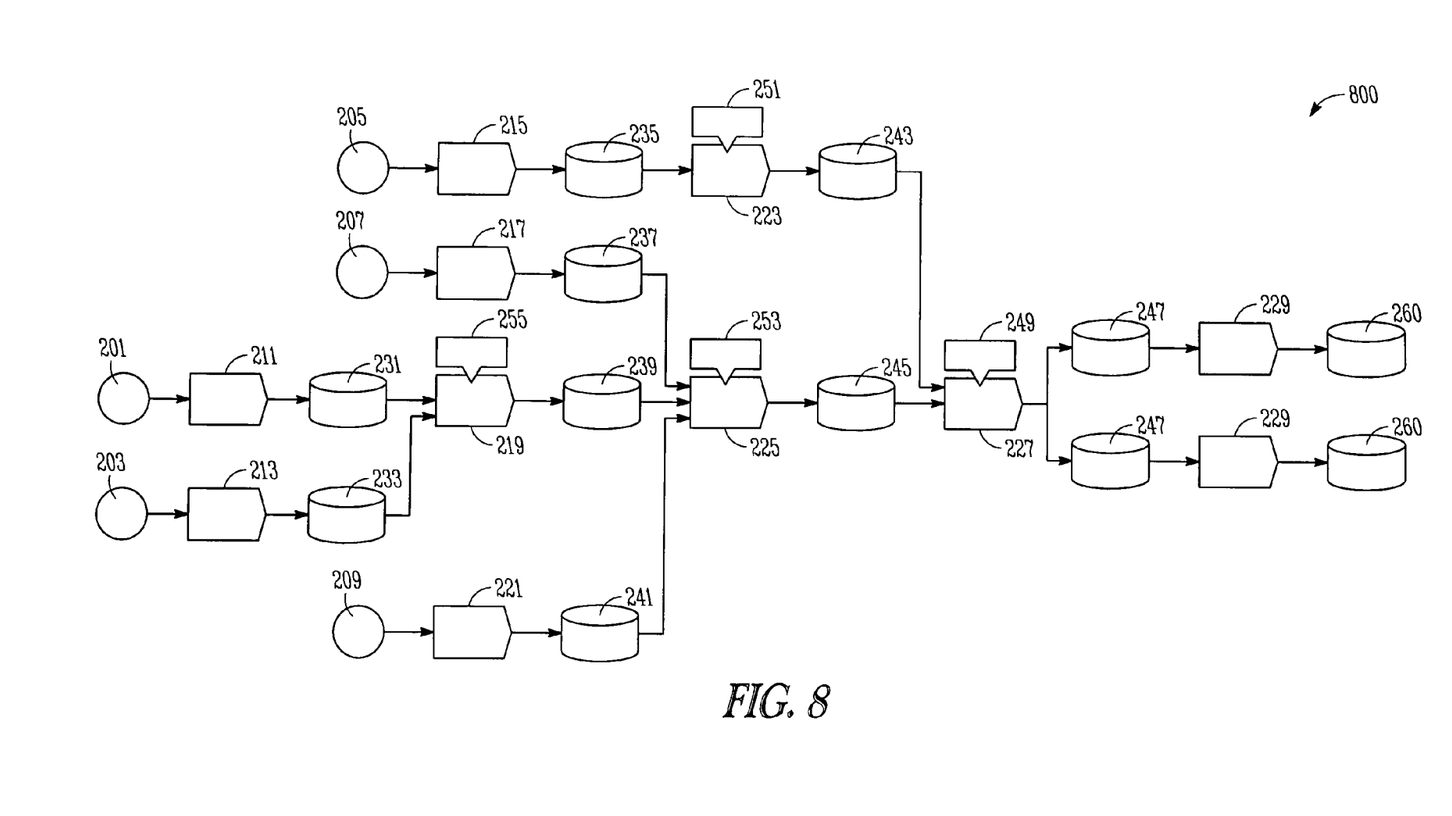
FIG. 8 illustrates a cell graph 800 configured to provide an enhanced view of the data in diverse subsystems but without necessarily producing, or having, the unified data model shown in FIG. 2, according to a further embodiment of the invention.

FIG. 8 illustrates a cell graph 800 configured to provide an enhanced view of the data in diverse subsystems but without necessarily producing, or having, the unified data model shown in FIG. 2, according to a further embodiment of the invention.

The cell graph 800 resembles the cell graph 200 of FIG. 2 in many aspects. The cell graph 800 comprises a plurality of "importer" cells 211, 213, 215, 217, 221 configured to take data sources 201, 203, 205, 207 and 209 and map them to a representation such as RDF, according to an embodiment of the invention. The cell graph 800 also comprises a plurality of processing cells 219, 223, 225, 227, 229 configured to take one or more inputs carrying data (e.g., RDF-formatted data) and emit data (e.g., RDF-formatted data) through an output. The cell graph 800 additionally contains a plurality of data repositories 231, 233, 235, 237, 239, 241, 243, 245 configured to store semantic knowledge models in a format such as RDF, wherein the data repositories may be queried either directly by end users through the user interfaces of the embodiment or by external systems interacting with the embodiment, about the semantic knowledge modeling information that they contain. Data is progressively enriched through the application of semantic knowledge models 251, 253, 255, 249 to enable inference over the semantic data format (e.g., the RDF data) and combined through processing at each cell to produce a unified model held in the merged model stored in repository 247.

While the cell graph 200 shown in FIG. 2 ultimately builds to a single unified data model, the cell graph 800 shown in FIG. 8 does not necessarily build to a unified data model. After the processing cell 227 has completed its processing, the results are separately stored in data repositories 801, 807. The data stored in repositories 801, 807 may have different formats and/or different data values or data ranges, according to an embodiment of the invention. Processing cells 803, 809 respectively operate on the data in repositories 801, 807 to further refine the data, ultimately producing data models stored in repositories 805, 811. The data stored in repositories 805, 811 need not have the same formats, ranges, or necessarily any other data characteristics, according to an embodiment of the invention. The cell graph 800 thus provides a cell graph that unifies disparate data sets up to a point and then allows them to diverge again to satisfy the needs of various end user data consumers, according to an embodiment of the invention. The divergence in the data could occur at a location other than at processing cell 227 as shown in FIG. 8. The divergence could occur at other locations, such as at processing cell 225, and multiple divergences could be possible, e.g., at both processing cell 255 and processing cell 227.

Cell graph 800 may have a variety of applications. For example, one such possible application is in a unified billing system. The data sources would typically comprise the components of a telecom system such that the data is then fed through a billing system that unifies data in a manner consistent across all billing systems up to cell 249 and then customizes the data for one telephone operator along the 801-803-805 path while differently customizing the data for another telephone operator along the 807-809-811 path.

While specific embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims. In general, in the following claims, the terms used should not be construed to limit the invention to the specific embodiments disclosed in the specification, but should be construed to include all systems and methods that operate under the claims set forth hereinbelow. Thus, it is intended that the invention covers the modifications and variations of this invention provided they come within the scope of the appended claims and their equivalents.

We claim:

1. A computerized system configured to enhance data originating from a distributed data set comprising an ontology and individual data elements, the individual data elements having a plurality of formats, the computerized system comprising:
    a plurality of computerized processing cells,
        each computerized processing cell configured to add inferences to individual data elements from the distributed data set by translating a portion of the individual data elements from the distributed data set into a common semantic information representation shared among the plurality of computerized processing cells,
    wherein at least a portion of the plurality of computerized processing cells are arranged in a first computerized data cell graph configured to progressively build a first semantic knowledge model from the individual data elements in the distributed data set in the common semantic information representation.

2. The computerized system of claim 1 wherein the portion of the computerized processing cells are configured to build the first semantic knowledge model as a unified semantic knowledge model of data from the distributed data set.

3. The computerized system of claim 1 wherein each computerized processing cell is further configured to transform the structure of its translated portion of the distributed data set.

4. The computer system of claim 1 wherein a second portion of the plurality of computerized processing cells are arranged in a second computerized data cell graph to progressively build a second semantic knowledge model from the distributed data set in the common semantic information representation.

5. The computerized system of claim 1 wherein each computerized processing cell in a portion of the plurality of computerized processing cells is configured to answer queries regarding its respective translated portion of the distributed data set.

6. The computerized system of claim 1 wherein the plurality of computerized processing cells are configured to use as the common semantic information representation a Resource Description Framework (RDF) language.

7. A computerized cell graph configured to produce a unified semantic knowledge model from a plurality of data sources each having at least one ontology and individual data elements in disparate data formats, the computerized cell graph comprising:

a plurality of computerized importer cells, wherein each importer cell is configured to retrieve an individual data element from a data source of the plurality of data sources and translate the retrieved individual data element into a common semantic information representation;

a plurality of data repositories, wherein a portion of the data repositories are configured to receive and store translated individual data elements received from importer cells of the plurality of importer cells in the common semantic information representation; and a plurality of computerized processing cells, wherein each processing cell is configured to retrieve an individual data element from at least one data repository of the plurality of data repositories, enhance the retrieved individual data element to further develop the unified semantic knowledge model and store the enhanced retrieved individual data element in the common semantic information representation in a data repository of the plurality of data repositories;

wherein the plurality of importer cells, the plurality of data repositories, and the plurality of processing cells are arranged to progressively create the unified semantic knowledge model from the plurality of data sources, a processing cell of the plurality of processing cells configured to complete the unified semantic knowledge model and store it in a data repository of the plurality of data repositories.

8. The computerized cell graph of claim 7 wherein a portion of the plurality of data repositories are configured to accept and answer queries about semantic knowledge models stored thereon.

9. The computerized cell graph of claim 7 wherein at least some of the plurality of processing cells are located on different computers.

10. The computerized cell graph of claim 7 wherein importer cells of the plurality of importer cells are configured to use the Resource Description Framework (RDF) language as the common semantic information representation.

11. A computerized system configured to enhance data from a distributed data set comprising an ontology and individual data elements, the individual data elements having different data formats, the computerized system comprising:

a plurality of individual data element repositories, each individual data element repository configured to retain a portion of the distributed data set translated into a uniform semantic language; and a plurality of computerized processing cells,
  each processing cell configured to perform at least one of applying rules to classify individual data elements retrieved from a data repository of the plurality of data repositories against a semantic knowledge model and/or adding inferred facts to individual data elements retrieved front a data repository of the plurality of individual data element repositories and/or transforming a data structure of individual data elements retrieved from an individual data element repository of the plurality of individual data element repositories, wherein the plurality of processing cells are configured in a computerized data cell graph so as to progressively create a unified semantic knowledge model from the distributed data set.

12. The computerized system of claim 11 wherein rules applied by each processing cell of at least a portion of the plurality of computerized processing cells comprise inferences based upon a semantic knowledge model selected for the processing cell.

13. The computerized system of claim 11 wherein at least a portion of the processing cells are further configured to answer queries related to individual data elements processed by the processing cell.

14. A computerized method for enhancing data originating from a distributed data set comprising an ontology and individual data elements, the individual data elements having a plurality of formats, the computerized method comprising:

translating an individual data element from the distributed data set into a common semantic information representation shared among a plurality of computerized processing cells arranged in a first computerized data cell graph; and adding inferences to portions of the translated individual data element by the first computerized data cell graph to progressively construct a first semantic knowledge model in the common semantic information representation.

15. The method of claim 14, further comprising constructing the first semantic knowledge model by the computerized data cell graph as a unified semantic knowledge model of data from the distributed data set.

16. The method of claim 14, further comprising building the first semantic knowledge model by transforming data structures associated with translated individual data elements by the computerized processing cells of the computerized data cell graph.

17. The method of claim 14, further comprising building a second semantic knowledge model from the distributed data set in the common semantic information representation by a second portion of the plurality of computerized processing cells arranged in a second computerized data cell graph.

18. The method of claim 14, further comprising answering queries regarding translated portions of the distributed data set by computerized processing cells of the plurality of computerized processing cells.

19. The method of claim 14, further comprising configuring the plurality of computerized processing cells to use a Resource Description Framework (RDF) language as the common semantic information representation.

20. A method for producing a unified semantic knowledge model from a plurality of data sources having individual data elements in disparate data formats, the method comprising using a computerized cell graph to:

progressively building the unified semantic knowledge model from the plurality of data sources using the computerized cell graph comprising a plurality of importer cells, a plurality of data element repositories, and the plurality of processing cells arranged to perform the steps of:

translating an individual data element retrieved from data sources of the plurality of data sources into a common semantic information representation by a plurality of computerized importer cells;

storing translated individual data elements received from importer cells of the plurality of importer cells in the common semantic information representation in a plurality of data repositories; and enhancing an individual data element retrieved from data repositories of the plurality of data repositories in a plurality of computerized processing cells and storing the enhanced retrieved data in the common semantic information representation in a data repository of the plurality of data repositories.

21. The method of claim 20, further comprising:
  completing the unified semantic model in a processing cell of the plurality of processing cells by adding a final data enhancement; and
  storing the unified semantic model in a data repository of the plurality of data repositories.

22. The method of claim 20, further comprising receiving and answering queries about semantic knowledge models stored in a portion of the plurality of data repositories.

23. The method of claim 20 wherein at least some of the plurality of processing cells are located on different computers, the method further comprising communicating among the plurality of processing cells.

24. The method of claim 20, further comprising configuring importer cells of the plurality of importer cells to use the Resource Description Framework (RDF) language as the common semantic information representation.

25. A computerized method for enhancing data from a distributed data set comprising an ontology and individual data elements, the individual data elements having of different data formats, the computerized method comprising:
  progressively creating a unified semantic knowledge model from the distributed individual data set elements using a plurality of computerized processing cells arranged in a computerized data cell graph configured to create the unified semantic model by:
    translating portions of the distributed individual data set elements into a uniform semantic language and storing each translated individual data element portion in a plurality of data element repositories; and
    retrieving translated individual data element portions from the plurality of individual data element repositories by computerized processing cells of the computerized data cell graph and enhancing the retrieved individual data elements by performing at least one of applying rules to classify retrieved translated individual data element portions against a semantic knowledge model and/or adding inferred facts to retrieved translated individual data element portions and/or transforming a data structure of retrieved translated individual data element portions.

26. The method of claim 25 wherein rules to classify retrieved translated data element portions comprise the step of adding inferences to the retrieved translated individual data element portions based upon a semantic knowledge model selected for the processing cell.

27. The method of claim 25, further comprising answering queries about individual data elements processed by a processing cell of the plurality of processing cells.

28. A method for producing a unified semantic knowledge model from a plurality of individual data element sources having disparate semantic knowledge models, the method comprising:
  mapping individual data element sources of the plurality of individual data element sources into a common semantic language using a plurality of computerized importer cells, wherein each importer cell is configured to perform the steps of:
    reviewing a first style sheet to generate a second style sheet using a format translation engine, wherein the first style sheet describes actions to be taken when a data translation engine reads a particular data structure, the first style sheet comprising a user-configurable mapping plan for the individual data element source mapped by the importer cell and wherein the second style sheet comprises the first style sheet in a format suitable for processing by an automated data translation engine;
    reading an input data format for the data source by a format-specific parser and producing a data file that describes data of the individual data element source in a format suitable for processing by an automated data translation engine; and
    transforming data from the individual data element source into data in the common semantic language by an automated data translation engine configured to use the data file produced by the format-specific parser and the second style sheet produced by the format translation engine; and
    making the transformed individual data elements available to other importer cells and external users.

29. The method of claim 28 wherein at least some of the plurality of computerized importer cells reside on different computers, the method further comprising configuring the plurality of computerized importer cells to communicate over an electronic network.

30. The method of claim 29, further comprising configuring an asynchronous event bus to provide communications among the plurality of importer cells by delivering event messages to importer cells of the plurality of importer cells.

31. The method of claim 30, further comprising configuring the asynchronous event bus to deliver event messages that communicate a state change of an importer cell of the plurality of importer cells.

32. The method of claim 31 wherein the state change is one of working, paused, or disposed.

33. The method of claim 32, further comprising configuring the asynchronous event bus to deliver event messages that communicate an action associated with an importer cell of the plurality of importer cells.

34. The method of claim 33 wherein the action communicated is one of trigger, pause, or resume.

* * * * *

UNITED STATES PATENT AND TRADEMARK OFFICE
CERTIFICATE OF CORRECTION

PATENT NO. : 8,214,319 B2  
APPLICATION NO. : 12/362043  
DATED : July 3, 2012  
INVENTOR(S) : Gould et al.

It is certified that error appears in the above-identified patent and that said Letters Patent is hereby corrected as shown below:

In column 13, line 44, In Claim 11, after "having", delete "of", therefor

In column 13, line 56, In Claim 11, delete "front", and insert --from--, therefor In column 15, line 19, In Claim 25, after "having", delete "of", therefor Signed and Sealed this  
Sixth Day of November, 2012

David J. Kappos  
*Director of the United States Patent and Trademark Office*